US009123252B2

(12) United States Patent
Nagata

(10) Patent No.: US 9,123,252 B2
(45) Date of Patent: Sep. 1, 2015

(54) DRIVE ASSIST APPARATUS

(75) Inventor: Shinichi Nagata, Yokohama (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/237,504

(22) PCT Filed: Aug. 10, 2011

(86) PCT No.: PCT/JP2011/068298
§ 371 (c)(1),
(2), (4) Date: Feb. 6, 2014

(87) PCT Pub. No.: WO2013/021491
PCT Pub. Date: Feb. 14, 2013

(65) Prior Publication Data
US 2014/0180568 A1   Jun. 26, 2014

(51) Int. Cl.
G01S 13/93 (2006.01)
G08G 1/16 (2006.01)
B60T 7/22 (2006.01)
B60W 30/095 (2012.01)
(Continued)

(52) U.S. Cl.
CPC . G08G 1/166 (2013.01); B60T 7/22 (2013.01); B60W 30/0953 (2013.01); B60W 30/0956 (2013.01); B60W 30/143 (2013.01); B60W 30/18154 (2013.01); B60T 2210/34 (2013.01); B60W 2550/14 (2013.01); B60W 2720/10 (2013.01); G01S 13/93 (2013.01); G01S 13/931 (2013.01); G01S 2013/935 (2013.01); G01S 2013/9321 (2013.01); G01S 2013/9346 (2013.01); G01S 2013/9367 (2013.01); G08G 1/16 (2013.01)

(58) Field of Classification Search
CPC .................. G01S 13/93; G01S 13/931; G01S 2013/9321; G01S 2013/9346; G01S 2013/935; G01S 2013/9364; G01S 2013/9367; G08G 1/16
USPC ................ 701/36, 70, 79, 301; 340/435–437, 340/901–905, 906
See application file for complete search history.

(56) References Cited

U.S. PATENT DOCUMENTS 7,379,813 B2 * 5/2008 Kubota et al. .................. 701/523
7,904,247 B2 * 3/2011 Nakamori ...................... 701/301
(Continued)

FOREIGN PATENT DOCUMENTS

JP  2006-260217 A   9/2006
JP  2010-267211 A   11/2010
(Continued)

Primary Examiner — Thomas Tarcza
Assistant Examiner — Tyler J Lee
(74) Attorney, Agent, or Firm — Kenyon & Kenyon LLP

(57) ABSTRACT

A drive assist apparatus includes: a dead zone recognition unit that recognizes a dead zone not visible to a driver in an advancement direction of a host vehicle; a moving body information setting unit that sets, as information relating to a moving body that may jump out from the dead zone, moving body information including at least an assumed speed of the moving body; a speed region calculation unit that calculates, on the basis of the moving body information set by the moving body information setting unit, a speed region of the host vehicle, the speed region being a region in which the host vehicle may contact the moving body if the host vehicle advances in the advancement direction; and a target speed calculation unit that calculates a target speed of the host vehicle on the basis of the speed region.

13 Claims, 12 Drawing Sheets

(51) Int. Cl.
*B60W 30/14* (2006.01)
*B60W 30/18* (2012.01)

(56) References Cited

U.S. PATENT DOCUMENTS

| 8,362,889 | B2* | 1/2013 | Komori | 340/435 |
| 8,362,922 | B2* | 1/2013 | Kushi et al. | 340/905 |
| 2005/0012604 | A1* | 1/2005 | Takahashi | 340/435 |
| 2011/0102195 | A1 | 5/2011 | Kushi et al. | |
| 2011/0169625 | A1* | 7/2011 | James et al. | 340/439 |
| 2012/0059789 | A1 | 3/2012 | Sakai et al. | |
| 2012/0212353 | A1* | 8/2012 | Fung et al. | 340/905 |

FOREIGN PATENT DOCUMENTS

| JP | 2011-014097 A | 1/2011 |
| JP | 2011-044085 A | 3/2011 |
| JP | 2011-096009 A | 5/2011 |
| JP | 2011-118570 A | 6/2011 |

* cited by examiner

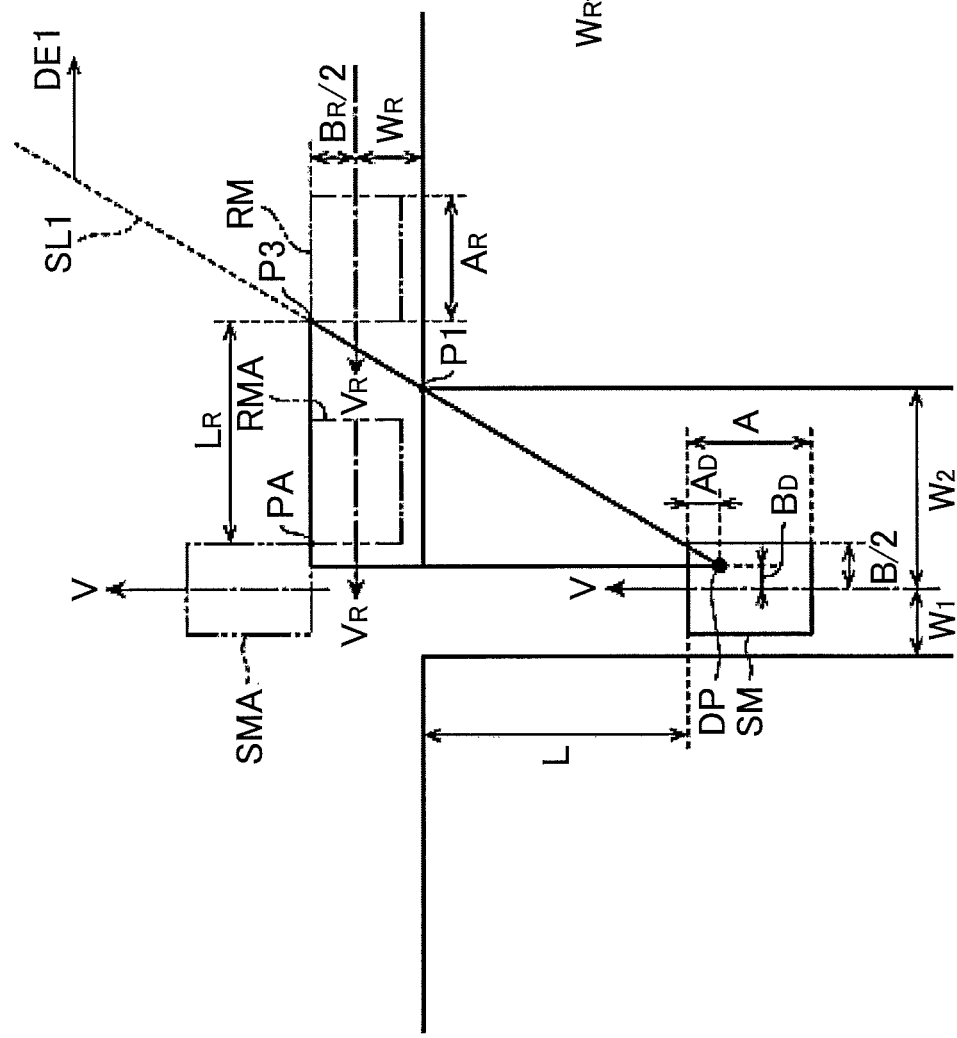

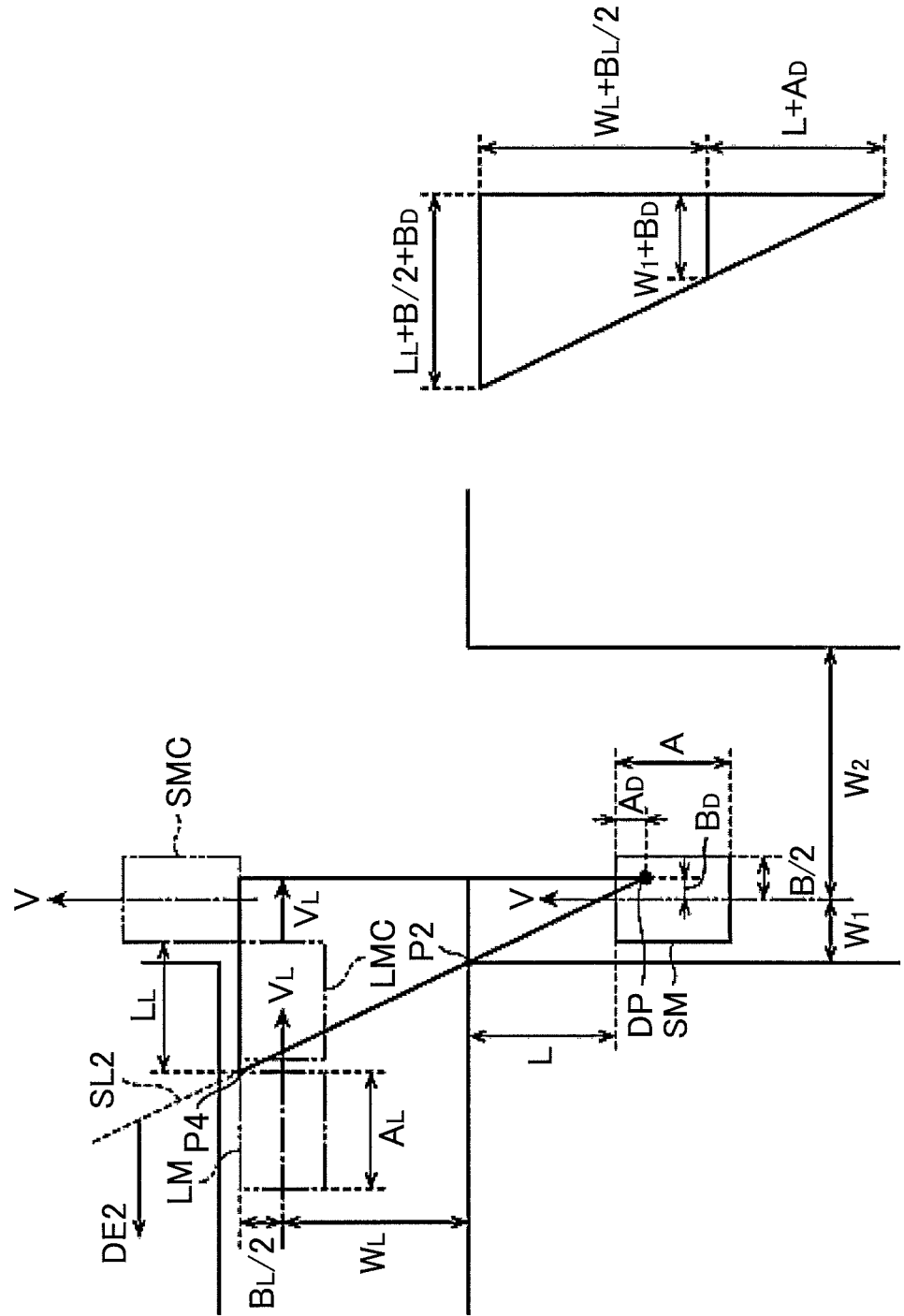

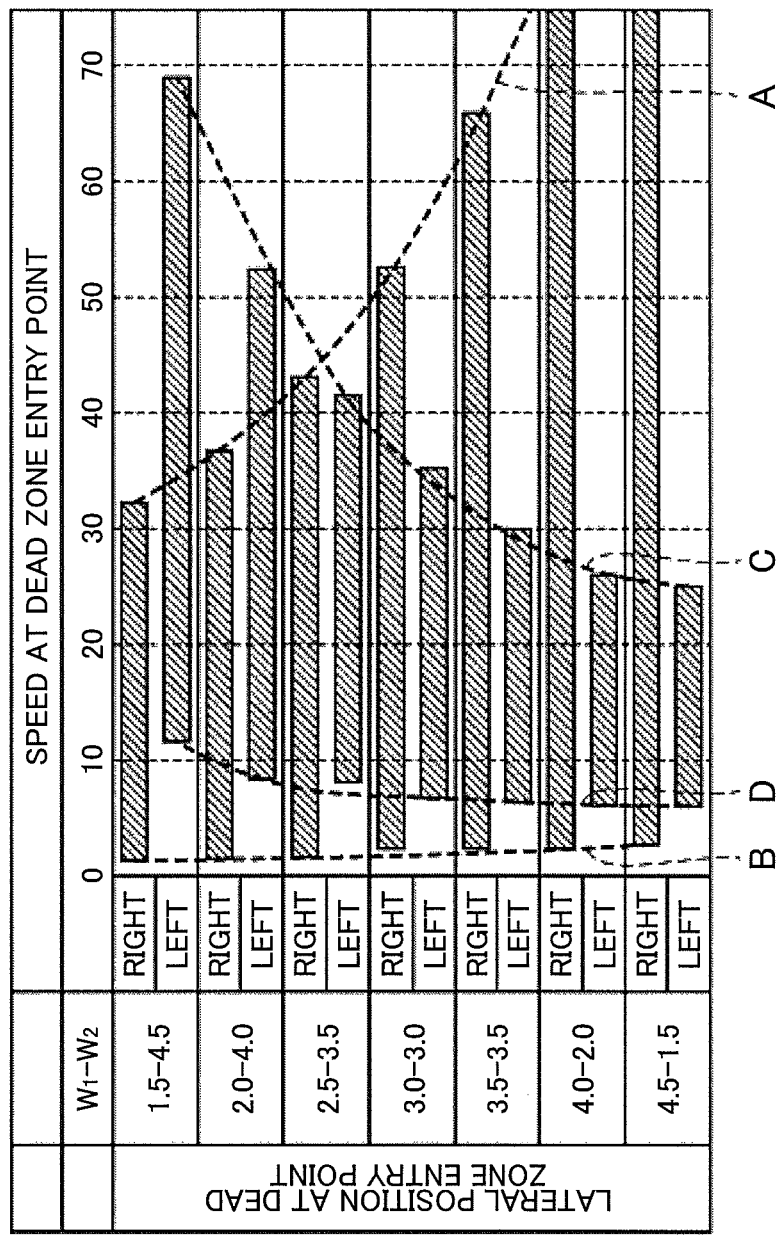
F I G . 10

F I G. 12

| CALCULATED DANGEROUS DIRECTION | | GAZE DIRECTION OF DRIVER | | |
|---|---|---|---|---|
| | | LEFT | FRONTWARD | RIGHT |
| | LEFT | NO ASSISTANCE OR REDUCED ASSISTANCE | SLIGHTLY INTENSIFIED ASSISTANCE | INTENSIFIED ASSISTANCE |
| | BOTH | SLIGHTLY INTENSIFIED ASSISTANCE | NORMAL ASSISTANCE | SLIGHTLY INTENSIFIED ASSISTANCE |
| | RIGHT | INTENSIFIED ASSISTANCE | SLIGHTLY INTENSIFIED ASSISTANCE | NO ASSISTANCE OR REDUCED ASSISTANCE |

DRIVE ASSIST APPARATUS

CROSS-REFERENCE TO RELATED APPLICATIONS

This is a national phase application based on the PCT International Patent Application No. PCT/JP2011/068298 filed on Aug. 10, 2011, the entire contents of which are incorporated herein by reference.

TECHNICAL FIELD

The invention relates to a drive assist apparatus.

BACKGROUND ART

In a conventional drive assist apparatus, driving assistance is provided while taking into consideration objects that jump out from a dead zone when entering an intersection or the like. For example, a drive assist apparatus described in Patent Document 1 predicts a course of a host vehicle, recognizes a dead zone not visible to a driver in an advancement direction of the host vehicle, predicts an object that may jump out from the dead zone, detects a movable range of the object, determines that a collision may occur when the range overlaps the predicted course of the host vehicle, and performs driving assistance to avoid the collision.

Patent Document 1: Japanese Patent Application Publication No. 2006-260217

SUMMARY OF THE INVENTION

However, this conventional drive assist apparatus provides driving assistance using the predicted course of the host vehicle. Therefore, the conventional drive assist apparatus avoids a collision by determining whether or not a collision will occur if the host vehicle travels along the currently predicted course, but is unable to calculate a speed reduction required to avoid the collision, an amount of evasion required to avoid the collision, and so on. Further, the collision determination made by the conventional drive assist apparatus is greatly dependent on the precision with which a future position of the host vehicle is predicted, and therefore the precision of the collision determination may decrease when the prediction precision deteriorates (when acceleration, deceleration, or steering is underway in the host vehicle, for example). In this case, the conventional drive assist apparatus may provide unnecessary driving assistance or may not provide driving assistance at a required timing, causing the driver to experience discomfort.

The invention has been designed to solve these problems, and an object thereof is to provide a drive assist apparatus that can provide appropriate driving assistance with which safety can be secured reliably.

A drive assist apparatus includes: a dead zone recognition unit that recognizes a dead zone not visible to a driver in an advancement direction of a host vehicle; a moving body information setting unit that sets, as information relating to a moving body that may jump out from the dead zone, moving body information including at least an assumed speed of the moving body; a speed region calculation unit that calculates, on the basis of the moving body information set by the moving body information setting unit, a speed region of the host vehicle, the speed region being a region in which the host vehicle may contact the moving body when the host vehicle advances in the advancement direction; and a target speed calculation unit that calculates a target speed of the host vehicle on the basis of the speed region.

In the drive assist apparatus, the moving body information setting unit predicts a moving body that may jump out from the dead zone, and sets moving body information relating to the moving body. Further, the speed region calculation unit can calculate a travel speed of the host vehicle at which the host vehicle may come into contact with the moving body on the basis of the assumed speed of the moving body predicted to jump out from the dead zone. The speed region calculation unit can then calculate a speed region in which the host vehicle may come into contact with the moving body as the speed region of the host vehicle. The target speed calculation unit calculates the target speed on the basis of the calculated speed region. Hence, the drive assist apparatus, rather than comparing an envisaged moving body with a predicted course of the host vehicle, calculates the speed region in which contact with the moving body may occur, and then calculates the target speed on the basis of this calculation. In so doing, the drive assist apparatus can perform control on the basis of a specific target speed at which the host vehicle should travel, and can therefore provide driving assistance with which a high degree of safety is secured. Furthermore, the driving assistance provided by the drive assist apparatus is not affected by the precision with which the path of the host vehicle is predicted, and therefore appropriate driving assistance can be provided. As a result, the drive assist apparatus is capable of providing appropriate driving assistance with which safety can be secured reliably.

In the drive assist apparatus, the speed region may be determined from a relationship between a speed of the host vehicle and a distance of the host vehicle to a reference position in a location constituting the dead zone.

The drive assist apparatus may further include a target lateral position calculation unit that calculates a target lateral position of the host vehicle on the basis of the speed region calculated by the speed region calculation unit. The size of the dead zone varies according to the lateral position of the host vehicle, leading to variation in the danger of contact with the moving body. Hence, by having the target lateral position calculation unit calculate the target lateral position, the drive assist apparatus can provide appropriate driving assistance such that the host vehicle travels in a safe lateral position.

In the drive assist apparatus, the moving body information setting unit may set the moving body information on the basis of a shape of a road constituting the dead zone. Behavior of the moving body that may jump out from the dead zone is affected by the shape of the road, and therefore, by taking the shape of the road into consideration, the drive assist apparatus can provide driving assistance with a higher degree of precision.

In the drive assist apparatus, the moving body information setting unit may set the moving body information on the basis of a ratio between a moving body-side lane width and a host vehicle-side lane width. By taking the ratio between the respective lane widths into account in this manner, the drive assist apparatus can provide driving assistance more closely aligned with sensations of the driver and an actual speed at which the moving body jumps out.

In the drive assist apparatus, the moving body information setting unit may set the moving body information on the basis of a peripheral environment of the dead zone. By taking the peripheral environment of the dead zone into consideration in this manner, the drive assist apparatus can provide driving assistance more closely aligned with the sensations of the driver.

The drive assist apparatus may further include a traffic information acquisition unit that obtains traffic information relating to the road constituting the dead zone, and the moving body information setting unit may set the moving body information on the basis of the traffic information obtained by the traffic information acquisition unit. By taking into consideration traffic information that cannot be learned simply from the information relating to the periphery of the dead zone in this manner, the drive assist apparatus can provide effective driving assistance with which safety can be secured reliably when the host vehicle travels along a road having a particularly dangerous dead zone.

The drive assist apparatus may further include an experience information acquisition unit that obtains experience information indicating past experience of the driver, and the moving body information setting unit may set the moving body information on the basis of the experience information obtained by the experience information acquisition unit. By using information indicating the past experience of the driver in this manner, the drive assist apparatus can provide driving assistance in alignment with the experience of the driver.

The drive assist apparatus may further include an object information acquisition unit that obtains object information relating to behavior of an object existing on a periphery of the host vehicle, and the moving body information setting unit may set the moving body information on the basis of the object information obtained by the object information acquisition unit. The behavior of objects on the periphery of the host vehicle also affects the speed and so on of the moving body that jumps out, and by taking this information into consideration, the drive assist apparatus can provide driving assistance more suited to the situation.

The drive assist apparatus may further include a warning issuance control unit that issues a warning to the driver to alert the driver to the dead zone, and when the dead zone exists in a plurality of directions, the warning issuance control unit may determine a dangerous direction in which great danger exists on the basis of a shape of the speed region calculated by the speed region calculation unit, and control warning issuance so that the driver looks toward the dangerous direction. Thus, the drive assist apparatus can issue a warning that causes the driver to look toward the dangerous direction in which great danger exists, and as a result, a danger forestalling effect can be improved.

The drive assist apparatus may further include a gaze direction detection unit that detects a gaze direction of the driver, and the warning issuance control unit may control warning issuance on the basis of the dangerous direction and the gaze direction. By controlling warning issuance in consideration of the gaze direction of the driver in this manner, a load on the driver can be reduced, and in a situation where driving assistance actually becomes necessary, the driving assistance can be executed more effectively.

According to the invention, appropriate driving assistance can be provided, and as a result, safety can be secured reliably.

BRIEF DESCRIPTION OF THE DRAWINGS

FIG. 4 is a model diagram used by a speed region calculation unit to calculate a condition A.

FIG. 6 is a model diagram used by the speed region calculation unit to calculate a condition C.

FIG. 10 is an example of a map showing a relationship between a speed and a vehicle lateral position at a dead zone entry point.

FIG. 12 is a view showing an example of control patterns based on a calculated dangerous direction and a gaze direction of a driver.

MODES FOR CARRYING OUT THE INVENTION

Figure 1:
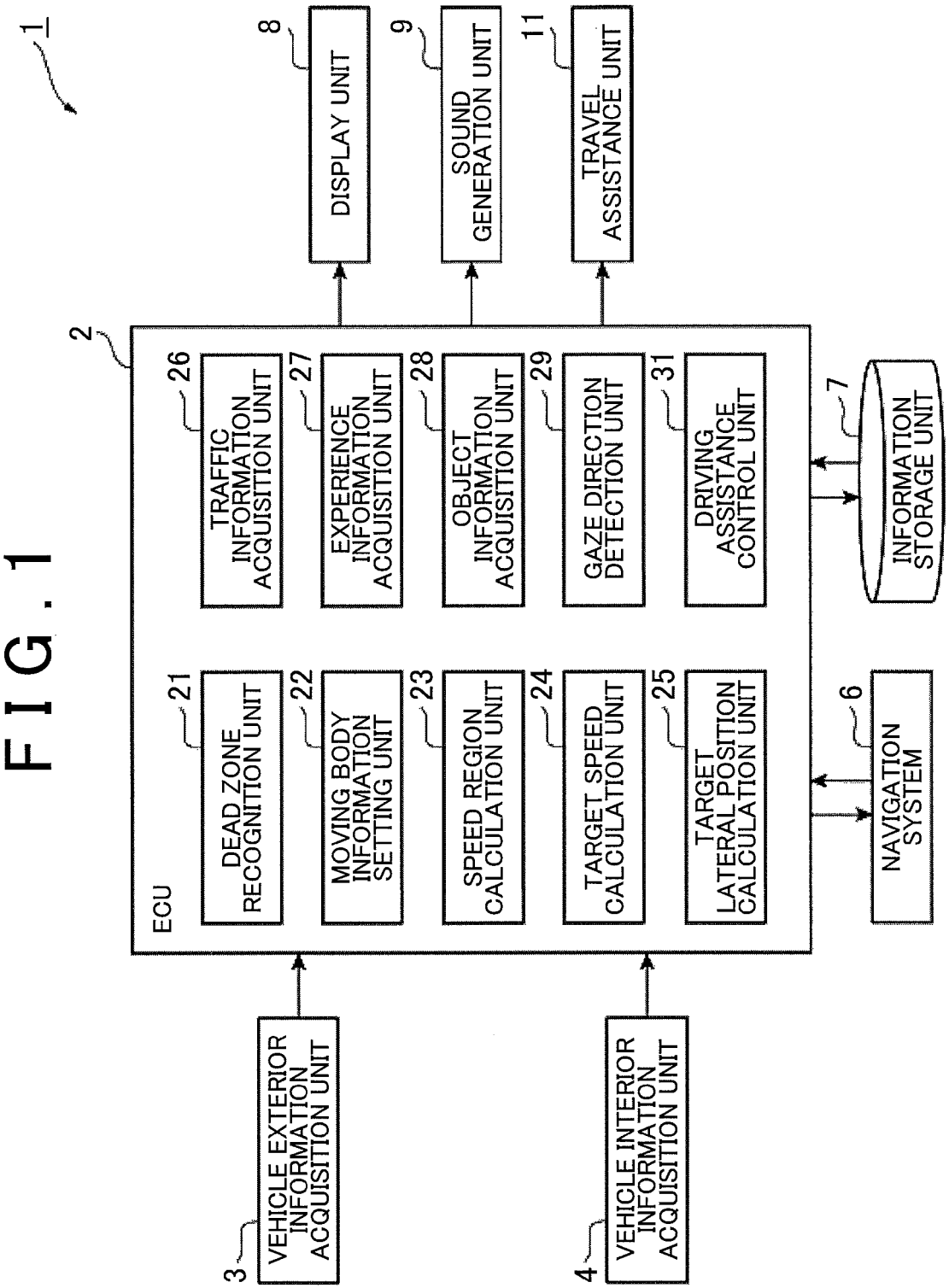
FIG. 1 is a block diagram showing a configuration of a drive assist apparatus according to an embodiment.
Figure 2:
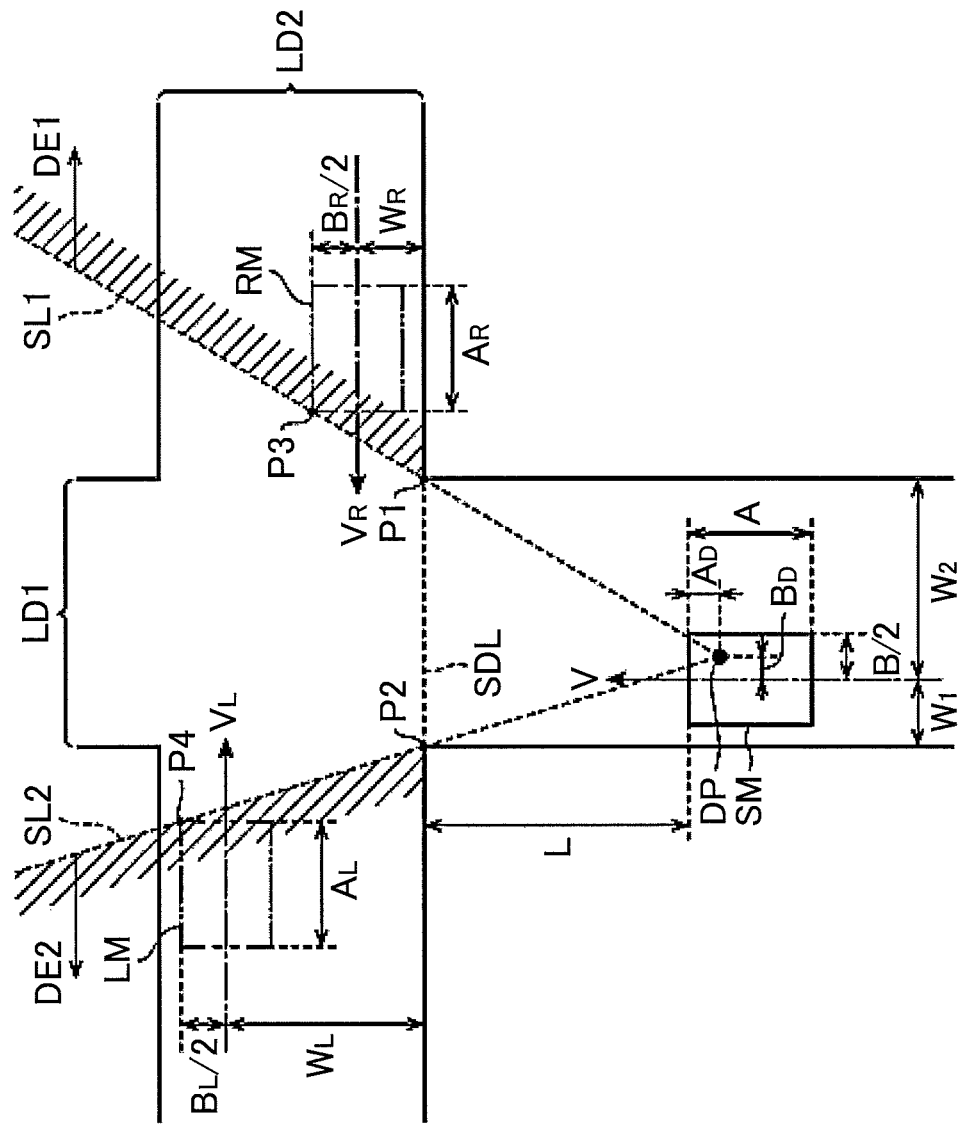
FIG. 2 is a view showing an example of a condition immediately before a host vehicle enters an intersection.

An embodiment of a drive assist apparatus will be described below with reference to the drawings. FIG. 1 is a block diagram showing a configuration of the drive assist apparatus according to this embodiment. FIG. 2 is a view showing an example of a condition immediately before a host vehicle SM enters an intersection. On the intersection shown in FIG. 2, a lane in which the host vehicle SM travels is denoted as LD1, and a lane intersecting the lane LD1 is denoted as LD2. In FIG. 2, it is assumed that the lane LD1 in which the host vehicle SM travels is a priority lane. It is also assumed that structures such as walls, fences, and buildings are provided on both sides of at least the lane LD1. At this type of intersection, as shown in FIG. 1, a dead zone DE1 is formed on a right side of the host vehicle SM, and a dead zone DE2 is formed on a left side of the host vehicle SM. A viewing field of a driver DP of the host vehicle SM is blocked by a right side corner P1 and a left side corner P2. Hence, the right side dead zone DE1 is formed in a region on a right side of a sight line SL1 passing through the right side corner P1, while the left side dead zone DE2 is formed in a region on a left side of a sight line SL2 passing through the left side corner P2. The drive assist apparatus 1 performs driving assistance on the host vehicle SM so that a collision can be avoided reliably when a moving body jumps out from the dead zones DE1, 2. Note that in this embodiment, other vehicles RM, LM are envisaged as moving bodies that may jump out from the dead zones DE1, 2.

As shown in FIG. 1, the drive assist apparatus 1 includes an electronic control unit (ECU) 2, a vehicle exterior information acquisition unit 3, a vehicle interior information acquisition unit 4, a navigation system 6, an information storage unit 7, a display unit 8, a sound generation unit 9, and a travel assistance unit 11.

The vehicle exterior information acquisition unit 3 has a function for obtaining information relating to the exterior on a periphery of the host vehicle SM. More specifically, the vehicle exterior information acquisition unit 3 has a function for obtaining various information relating to structures forming the dead zones on the periphery of the host vehicle SM, moving objects such as cars, pedestrians, and bicycles, white lines and stop lines in the vicinity of the intersection, and so on. The vehicle exterior information acquisition unit 3 is constituted by, for example, a camera that obtains images of the periphery of the host vehicle SM, a millimeter wave radar, a laser radar, and so on. The vehicle exterior information acquisition unit 3 can detect the structures on either side of the lane and objects such as vehicles by detecting edges existing on the vehicle periphery using radar, for example. Further, the vehicle exterior information acquisition unit 3 can detect white lines, pedestrians, and bicycles on the periphery of the host vehicle SM using the images captured by the camera, for example. The vehicle exterior information acquisition unit 3 outputs the obtained vehicle exterior information to the ECU 2.

The vehicle interior information acquisition unit 4 has a function for obtaining information relating to the interior of the host vehicle SM. More specifically, the vehicle interior information acquisition unit 4 is capable of detecting a position of the driver DP within the host vehicle SM, a head orientation and a sight line direction of the driver DP, and so on. The vehicle interior information acquisition unit 4 is constituted by, for example, a camera or the like that is provided in the vicinity of a driving seat to capture images of the driver DP. The vehicle interior information acquisition unit 4 outputs the obtained vehicle interior information to the ECU 2.

The navigation system 6 includes various information used to guide the driver DP, such as map information, road information, and traffic information. The navigation system 6 outputs predetermined information to the ECU 2 at a required timing. The information storage unit 7 has a function for storing various information, and is capable of storing past driving information relating to the driver DP, for example. The information storage unit 7 outputs predetermined information to the ECU 2 at a required timing.

The display unit 8, the sound generation unit 9, and the travel assistance unit 11 have functions for assisting driving by the driver DP in accordance with control signals from the ECU 2. The display unit 8 is constituted by a monitor, a head-up display, or the like, for example, and has a function for displaying information used during the driving assistance. The sound generation unit 9 is constituted by a speaker, a buzzer, or the like, and has a function for generating a voice or a buzzer sound used during the driving assistance. The travel assistance unit 11 is constituted by a braking device, a driving device, and a steering device, and has functions for decelerating the host vehicle SM to a target speed and moving the host vehicle SM to a target lateral position.

The ECU 2 performs overall control of the drive assist apparatus 1. The ECU 2 is mainly constituted by a CPU, for example, and also includes a read only memory (ROM), a random access memory (RAM), an input signal circuit, an output signal circuit, a power supply circuit, and so on. The ECU 2 includes a dead zone recognition unit 21, a moving body information setting unit 22, a speed region calculation unit 23, a target speed calculation unit 24, a target lateral position calculation unit 25, a traffic information acquisition unit 26, an experience information acquisition unit 27, an object information acquisition unit 28, a gaze direction detection unit 29, and a driving assistance control unit 31.

The dead zone recognition unit 21 has a function for recognizing a dead zone not visible to the driver DP in an advancement direction of the host vehicle SM. The dead zone recognition unit 21 obtains a position of the host vehicle SM, a position of the driver DP, a position of an intersection between the lanes LD1, LD2 (and positions of structures forming the dead zone), and so on from the various information obtained by the vehicle exterior information acquisition unit 3 and the vehicle interior information acquisition unit 4, and can recognize the dead zone from relationships between the respective positions. In the example shown in FIG. 2, the position of the host vehicle SM in the lane LD1 and the position of the driver DP in the host vehicle SM are recognized, and therefore the dead zone recognition unit 21 can recognize the dead zones DE1, DE2 on the basis of a positional relationship between the driver DP and the corners P1, P2.

The moving body information setting unit 22 has a function for setting moving body information relating to a moving body that may jump out from the dead zone. The moving body information includes, for example, information relating to an assumed speed, an assumed position, and an assumed size of the moving body. In the example shown in FIG. 2, the moving body information setting unit 22 predicts the other vehicle RM that may jump out from the right side dead zone DE1 and the other vehicle LM that may jump out from the left side dead zone DE2 as moving bodies. The other vehicles RM, LM are envisaged as objects that may jump out, and are not actually detected. The moving body information setting unit 22 sets the assumed speeds, assumed positions, and assumed sizes of the other vehicles RM, LM. There are no particular limitations on a method of setting the moving body information, but an example will be described in detail below.

Figure 8:
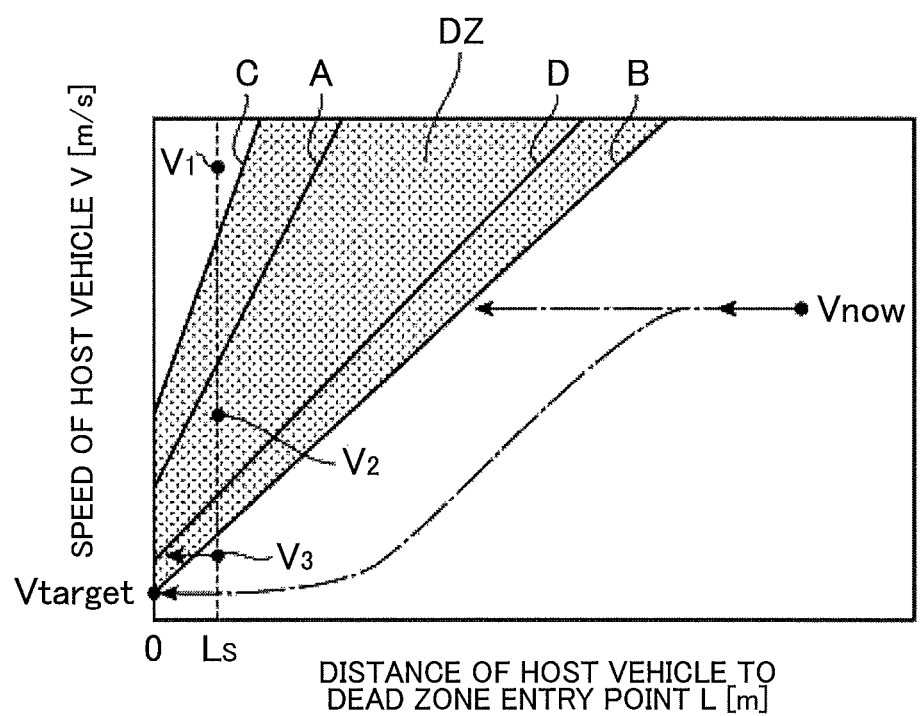
FIG. 8 is a graph showing a danger zone.

The speed region calculation unit 23 has a function for calculating, on the basis of the moving body information set by the moving body information setting unit 22, a speed region of the host vehicle in which the host vehicle may come into contact with a moving body if the host vehicle advances in the advancement direction. The speed region is determined from a relationship between a speed of the host vehicle and a distance of the host vehicle to a reference position in a location constituting the dead zone. More specifically, as shown in FIG. 8, the speed region calculation unit 23 determines a danger zone DZ as a speed region in which the possibility of a collision with another vehicle that jumps out is high by performing calculations using a coordinate system on which a speed V of the host vehicle SM is set on the ordinate and a distance L of the host vehicle SM to a dead zone entry point is set on the abscissa. When another vehicle jumps out suddenly from the dead zone while the host vehicle SM is traveling at a speed and in a position (a distance to the dead zone entry point) within the danger zone DZ, the likelihood of a collision between the host vehicle SM and the other vehicle at the intersection increases. A method of calculating the danger zone DZ will be described below. Note that the dead zone entry point, at which L=0 on a graph of the danger zone DZ, is a reference position set as desired in relation to the dead zone. In other words, the dead zone entry point is a reference position set in the location constituting the dead zone (i.e. the intersection) in order to specify the distance between the dead zone and the host vehicle SM. The reference position is set for use during calculation, and may be set in any position relative to the intersection. In this embodiment, the dead zone entry point set as the reference position is a boundary position between a position in which the possibility of contact between the host vehicle SM and a moving body jumping out from the dead zone is considered to arise and a position in which there is considered to be no possibility of contact between the host vehicle SM and a moving body that jumps out. In the example of FIG. 2, a host vehicle SM side edge portion of the lane LD2, or in other words a rectilinear part linking the corner P1 and the corner P2, is set as a dead zone entry point SDL. The reference position may be set as desired in alignment with shapes of roads at the intersection, arrangements and shapes of the structures constituting the dead zone, and so on.

The target speed calculation unit 24 has a function for calculating the target speed of the host vehicle SM on the basis of the speed region calculated by the speed region calculation unit 23, or in other words the danger zone DZ. More specifically, the target speed calculation unit 24 sets the target speed so as to avoid the danger zone DZ. The target speed calculation unit 24 calculates a speed at which the host vehicle SM does not enter the danger zone DZ after passing through the dead zone entry point SDL, and sets this speed as the target speed. A method of setting the target speed will be described below.

The target lateral position calculation unit 25 has a function for calculating the target lateral position of the host vehicle SM on the basis of the speed region calculated by the speed region calculation unit 23, or in other words the danger zone DZ. The target lateral position calculation unit 25 calculates a lateral position at which safety can be increased when the host vehicle SM passes through the dead zone entry point SDL, and sets this lateral position as the target lateral position. A method of setting the target lateral position will be described below.

The traffic information acquisition unit 26 has a function for obtaining traffic information relating to the roads constituting the dead zone, or in other words the intersection to be entered by the host vehicle SM. The traffic information acquisition unit 26 can obtain the traffic information from the navigation system 6 and the information storage unit 7. The traffic information includes, for example, an average volume of traffic on an opposing-side road, a number and a frequency of past accidents, a volume of pedestrians, and so on.

The experience information acquisition unit 27 has a function for obtaining information indicating a past experience of the driver DP. The experience information acquisition unit 27 obtains the information from the information storage unit 7. The experience information includes, for example, a number of times the driver DP has crossed the subject intersection in the past, a crossing frequency, an amount of time since a previous crossing, and so on.

The object information acquisition unit 28 has a function for obtaining object information relating to the behavior of an object existing on the periphery of the host vehicle SM. The object is not particularly limited, and may be any object that affects a moving body on the opposing-side lane. Examples of the object include a preceding vehicle, an oncoming vehicle, a pedestrian, a motorcycle, a bicycle, and so on. The object information includes information indicating a position, a size, a movement direction, a movement speed, and so on of the object. The object information acquisition unit 28 can obtain the object information from the vehicle exterior information acquisition unit 3.

The gaze direction detection unit 29 has a function for detecting a gaze direction of the driver DP. The gaze direction detection unit 29 obtains information from the vehicle interior information acquisition unit 4, and can detect the gaze direction from a facial orientation and a sight line orientation of the driver DP.

The driving assistance control unit 31 has a function for controlling driving assistance by transmitting control signals to the display unit 8, the sound generation unit 9, and the travel assistance unit 11 on the basis of results of the various calculations. The driving assistance control unit 31 has a function for performing driving assistance such that the host vehicle SM enters the intersection at the target speed and in the target lateral position. An assistance method will be described in detail below. The driving assistance control unit 31 also has a function for determining a dangerous direction in which great danger exists on the basis of a shape of the speed region (the danger zone DZ) calculated by the speed region calculation unit 23 when the dead zone exists in a plurality of directions. The driving assistance control unit 31 also has a function for issuing a warning to the driver DP using the display unit 8 and the sound generation unit 9 to cause the driver DP to look toward the dangerous direction.

Figure 3:
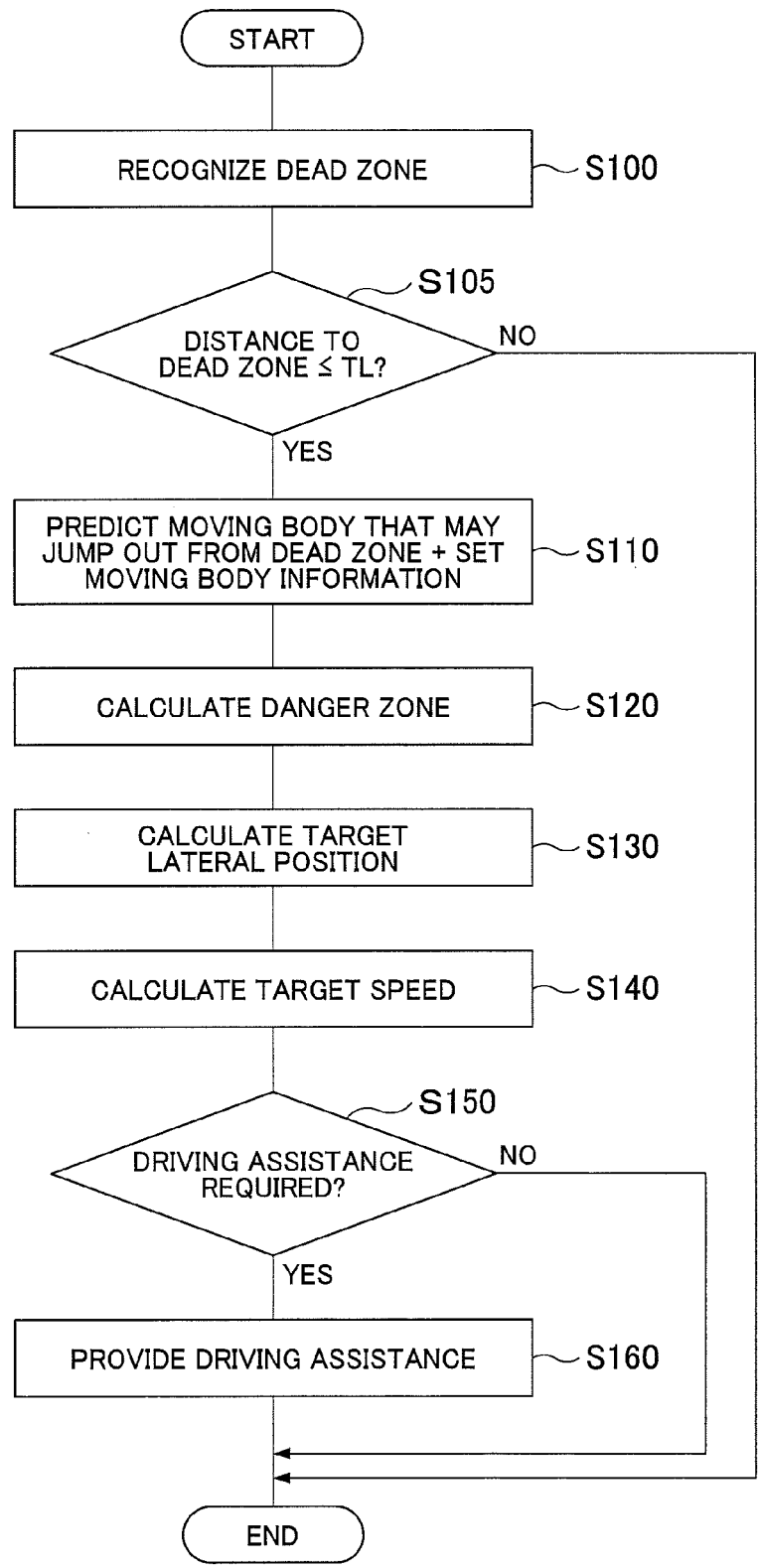
FIG. 3 is a flowchart showing the content of processing performed by the drive assist apparatus.

Next, referring to FIGS. 2 to 12, specific control processing performed by the drive assist apparatus 1 will be described. In this embodiment, processing content in a situation where the host vehicle SM enters an intersection such as that shown in FIG. 2 will be described. FIG. 3 is a flowchart showing the content of the processing performed by the drive assist apparatus 1. This processing is executed repeatedly at fixed period intervals while the host vehicle is operative.

As shown in FIG. 3, the dead zone recognition unit 21 of the ECU 2 recognizes the dead zone on the basis of the information from the vehicle exterior information acquisition unit 3 and the vehicle interior information acquisition unit 4 (step S100). The dead zone recognition unit 21 learns the position of the host vehicle SM in the lane LD1, the position of the driver DP in the host vehicle SM, and the positions of the structures constituting the dead zone in the advancement direction. The dead zone recognition unit 21 can then recognize the dead zones DE1, DE2 on the basis of the positional relationship between the driver DP and the corners P1, P2. Note that in FIG. 2, a vehicle width direction size and a front-rear direction size of the host vehicle SM are denoted by B and A, respectively (these sizes of the host vehicle SM may be stored in advance). As regards the lateral position of the host vehicle SM, using a center line as a reference, a leftward side interval and a rightward side interval within the lane LD1 are denoted by $W_1$ and $W_2$, respectively. Further, a distance between a front end of the host vehicle SM and the dead zone entry point SDL is denoted by L. As regards the position of the driver DP in the host vehicle SM, a distance of the driver DP in a width direction from a center line of the host vehicle SM is denoted by $B_D$, and a distance of the driver DP in a front-rear direction from the front end of the host vehicle SM is denoted by $A_D$. By specifying the position of the driver DP, a sight line SL1 passing the right side corner P1 is specified, enabling specification of the dead zone DE1, and a sight line SL2 passing the left side corner P2 is specified, enabling specification of the dead zone DE2. Note that respective ranges of the dead zones DE1, 2 vary according to the position (L, $W_1$, $W_2$) of the host vehicle SM, but the dead zone recognition unit 21 can specify the ranges of the dead zones DE1, 2 immediately through calculation from the positional relationship between the driver DP and the corners P1, P2.

The dead zone recognition unit 21 determines, on the basis of the dead zones DE1, 2 recognized in S100, whether or not a distance from the current position of the host vehicle SM to the dead zones DE1, 2 (or to the dead zone entry point SDL) is equal or smaller than a predetermined threshold TL (step S105). When it is determined by the dead zone recognition unit 21 in S105 that the distance is greater than the threshold TL, the processing shown in FIG. 3 is terminated, whereupon the processing is repeated from S100. The processing is likewise terminated when a dead zone cannot be recognized in S100. When the dead zone recognition unit 21 determines that the distance is equal or smaller than the threshold TL, on the other hand, the processing advances to step S110.

The moving body information setting unit 22 predicts moving bodies that may jump out from the dead zones DE1, 2, and sets moving body information relating to the moving bodies (step S110). In FIG. 2, the moving body information setting unit 22 predicts that the other vehicle RM may jump out from the right side dead zone DE1, and that the other vehicle LM may jump out from the left side dead zone DE2. The moving body information setting unit 22 then sets the assumed speeds, assumed positions, and assumed sizes of the other vehicles RM, LM as the moving body information. Here, the moving body information setting unit 22 sets an assumed speed $V_R$, an assumed vehicle width direction size $B_R$, and an assumed front-rear direction size $A_R$ of the other vehicle RM. The moving body information setting unit 22 also sets an assumed lateral position $W_R$ of the other vehicle RM. Note that here, the assumed lateral position is set as a side interval to an advancement direction left side using a center line of the other vehicle RM as a reference. The moving body information setting unit 22 sets a position in which the other vehicle RM jumps out first from the dead zone DE1 as an assumed advancement direction position of the other vehicle RM. In other words, a position in which a right side front corner portion P3 of the other vehicle RM enters the sight line SL1 is set as the assumed position. The moving body information setting unit 22 sets an assumed speed $V_L$, an assumed vehicle width direction size $B_L$, and an assumed front-rear direction size $A_L$ of the other vehicle LM. The moving body information setting unit 22 also sets an assumed lateral position $W_L$ of the other vehicle LM. Here, the assumed lateral position is set as a side interval to an advancement direction right side using a center line of the other vehicle LM as a reference. The moving body information setting unit 22 sets a position in which the other vehicle LM jumps out first from the dead zone DE2 as an assumed advancement direction position of the other vehicle LM. In other words, a position in which a left side front corner portion P4 of the other vehicle LM enters the sight line SL2 is set as the assumed position.

There are no particular limitations on a method of setting the assumed speed, and taking into account a lane width of the opposing-side lane LD2 and so on, a legal speed of the opposing-side road, an average vehicle entry speed based on past statistics, or an identical speed to the host vehicle SM, for example, may be set as the assumed speed. There are also no particular limitations on a method of setting the assumed position (assumed lateral position), and a central position of the travel lane, an average vehicle entry position based on past statistics, or an identical position to the host vehicle SM, for example, may be set as the assumed position. There are likewise no particular limitations on a method of setting the assumed size of the other vehicle, and data prepared in advance as a typical vehicle size, an average size of a typical passenger vehicle, or an identical size to the host vehicle SM, for example, may be set as the assumed size.

The moving body information setting unit 22 may also set the moving body information on the basis of the shapes of the roads constituting the dead zones DE1, 2 (i.e. the shape of the intersection). In the case of a T junction such as that shown in FIG. 11A, for example, the other vehicle can only perform a right or a left turn, and therefore a large speed reduction compared to forward travel is predicted. Further, in the case of a crossroad, it is necessary to predict that other vehicles will jump out from both the left and the right, whereas in the case of a T junction, it is necessary only to predict that another vehicle will jump out from a single lane LD3. Hence, when the intersection to be entered is a T junction, the moving body information setting unit 22 can set the assumed speed and assumed position of the other vehicle by modifying the assumed speed and position set in the case of a crossroad. By taking the shape of the road into consideration, the drive assist apparatus 1 can provide driving assistance with a greater degree of precision. Note that information relating to the shape of the road may be obtained by the moving body information setting unit 22 from the navigation system 6 or by having the vehicle exterior information acquisition unit 3 detect the shape of the road directly.

The moving body information setting unit 22 may also set the moving body information on the basis of a ratio between the other vehicle-side lane width and the host vehicle-side lane width. For example, when the host vehicle-side road is a large priority road and the opposing-side road is a small road, the opposing-side vehicle is unlikely to enter the intersection without decelerating. When, on the other hand, respective, sizes of the host vehicle-side road and the opposing-side road are identical or the opposing-side road is larger, the opposing-side vehicle is more likely to enter the intersection without decelerating. Hence, the moving body information setting unit 22 sets the assumed speed of the other vehicle in consideration of the ratio between the other vehicle-side lane width and the host vehicle-side lane width on the basis of a map such as that shown in FIG. 11B. By taking the ratio between the respective lane widths into account in this manner, the drive assist apparatus 1 can provide driving assistance more closely aligned with sensations of the driver and an actual speed at which the moving body jumps out.

The moving body information setting unit 22 may also set the moving body information on the basis of a peripheral environment of the dead zones DE1, 2. More specifically, the moving body information setting unit 12 sets information relating to movement of the other vehicle on the basis of the peripheral environment of the dead zones DE1, 2 as well as the shape of the intersection. For example, when a curve mirror is disposed at the intersection, it may be determined that the speed of the other vehicle will decrease. Further, when a stop line in the lane of the opposing-side vehicle is disposed close to the intersection and the stop line can be seen from the host vehicle, it may be determined that a point at which the other vehicle starts to decelerate will be late. In this case, it may be determined that the other vehicle will not decelerate until in the vicinity of the intersection, and therefore that an intersection entry speed will be high. When, on the other hand, the stop line in the lane of the opposing-side vehicle is disposed far from the intersection in a position that cannot be seen from the host vehicle, it may be determined that the point at which the other vehicle starts to decelerate will be early. In this case, it may be determined that the other vehicle will decelerate at an early stage, and therefore that the intersection entry speed will be low. Furthermore, when white lines such as side strips extend along both sides of the host vehicle-side lane LD1, which is a priority lane, and extend without interruption along a part corresponding to the opposing-side lane LD2, for example, the opposing-side vehicle is more likely to decelerate. Hence, the moving body information setting unit 22 may set the moving body information on the basis of the peripheral environment affecting the behavior of the other vehicle. By taking the peripheral environment of the dead zone into account in this manner, the drive assist apparatus 1 can provide driving assistance more closely aligned with the sensations of the driver.

The moving body information setting unit 22 may also set the moving body information on the basis of the traffic information obtained by the traffic information acquisition unit 26. For example, at an intersection where the average traffic volume, the number and frequency of past accidents, and so on of the opposing-side road are high, particular care is required, and therefore the moving body information must be set strictly. Further, at an intersection where the volume of pedestrians and so on is high, the speed of the opposing-side vehicle is more likely to decrease. The moving body information setting unit 22 may set the moving body information in consideration of effects brought about by this type of traffic information. By taking into consideration traffic information that cannot be learned simply from the information relating to the periphery of the dead zone in this manner, the drive assist apparatus 1 can provide effective driving assistance with which safety can be secured reliably.

The moving body information setting unit 22 may also set the moving body information on the basis of the experience information obtained by the experience information acquisition unit 27. For example, when the driver DP has crossed the subject intersection few times and infrequently in the past, the moving body information is set strictly to cause the driver DP to pay attention. The moving body information is likewise set strictly when a long time has passed since the previous crossing. The moving body information setting unit 22 may set the moving body information in consideration of effects brought about by this type of experience information. By using information indicating the past experience of the driver in this manner, the drive assist apparatus 1 can provide driving assistance aligned with the experience of the driver.

The moving body information may also be set on the basis of the object information obtained by the object information acquisition unit 28. For example, when an object such as a preceding vehicle, an oncoming vehicle, a pedestrian, a motorcycle, or a bicycle reaches (or is predicted to reach) the dead zone entry point a predetermined time before the host vehicle SM, this means that the opposing-side vehicle will decelerate. The moving body information setting unit 22 may set the moving body information in consideration of the behavior of a peripheral object. The behavior of objects on the periphery of the host vehicle also affects the speed and so on of the moving body that jumps out, and therefore, by taking this information into account, the drive assist apparatus 1 can provide driving assistance more suited to the situation.

Next, the speed region calculation unit 23 calculates the danger zone on the basis of the moving body information set in S110 (step S120). The speed region calculation unit 23 calculates the danger zone by calculating conditions on which the host vehicle can cross the intersection without colliding with a moving body that jumps out from the dead zone. More specifically, the speed region calculation unit 23 calculates "Condition A: A condition on which the host vehicle SM can cross first when the other vehicle RM jumps out from the right side dead zone DE1", "Condition B: A condition on which the other vehicle RM can cross first when the other vehicle RM jumps out from the right side dead zone DE1", "Condition C: A condition on which the host vehicle SM can cross first when the other vehicle LM jumps out from the left side dead zone DE2", and "Condition D: A condition on which the other vehicle LM can cross first when the other vehicle LM jumps out from the left side dead zone DE2". Here, the speed V of the host vehicle SM and the distance L of the host vehicle SM to the dead zone entry point, which are indicated respectively on the ordinate and the abscissa of the coordinate system in FIG. 8, are variables. It is assumed in the following description that the host vehicle SM travels straight at a fixed speed V, the other vehicle RM travels straight at a fixed assumed speed $V_R$, and the speeds and lateral positions thereof do not change midway. Further, in the following description, "front", "rear", "right", and "left" are based on the advancement directions of the respective vehicles.

(Condition A)

FIG. 4 is a model diagram used to calculate Condition A. A point PA at which a right front corner portion of the other vehicle RM and a right rear corner portion of the host vehicle SM overlap is shown in FIG. 4A. The position of the host vehicle SM and the position of the other vehicle RM at this time are denoted respectively by SMA and RMA. In FIG. 4A, a distance by which the host vehicle SM moves to the position SMA is $(L+W_R+B_R/2+A)$. A distance by which the other vehicle RM moves to the position RMA, meanwhile, is denoted by $L_R$.

Here, the distance $L_R$ is an unrecognized quantity. However, a right-angled triangle drawn from a positional relationship between the driver DP and the corner P1 and a right-angled triangle drawn from a positional relationship between the driver DP and the corner portion P3 have a homologous relationship, and therefore a relationship shown in Equation (1A) is established from a dimensional relationship shown in FIG. 4B. By expanding Equation (1A) to Equation (2A), the distance $L_R$ is expressed by Equation (3A). When a time required for the other vehicle RM to reach the position RMA is set as $t_{R\_}A$, the time $t_{R\_}A$ is expressed as shown in Equation (4A) using the distance $L_R$. Here, according to Condition A, a movement distance of the host vehicle SM needs to be equal to or greater than the movement distance required to reach the position SMA at a point where the other vehicle RM reaches the position RMA (i.e. upon the elapse of the time $t_{R\_}A$). In other words, the speed V of the host vehicle SM needs to be equal to or higher than a speed required for the host vehicle SM to reach the position SMA following the elapse of the time $t_{R\_}A$. Hence, when a speed required to satisfy Condition A is set as $V_A$, the speed $V_A$ is expressed as shown in Equation (5A).

$$L_R + (B/2 - B_D) : W_2 - B_D = L + A_D + W_R + B_R/2 : L + A_D \quad (1A)$$

$$(L_R + B/2 - B_D)(L + A_D) = (W_2 - B_D)(L + A_D + W_R + B_R/2) \quad (2A)$$

$$L_R = \{(W_2 - B_D)(L + A_D + W_R + B_R/2) - (B/2 - B_D)(L + A_D)\}/(L + A_D) \quad (3A)$$

$$t_{R\_}A = L_R / V_R \quad (4A)$$

$$V_A \geq (A + L + W_R + B_R/2)/t_{R\_}A \quad (5A)$$

The speed region calculation unit 23 specifies a region in which Condition A is satisfied on the coordinate system shown in FIG. 8. More specifically, the speed region calculation unit 23 draws a graph A showing min ($V_A$) using Equations (3A), (4A), and (5A). The speed region calculation unit 23 then sets a speed region at and above min ($V_A$) as the region in which Condition A is satisfied.

(Condition B)

Figure 5B:
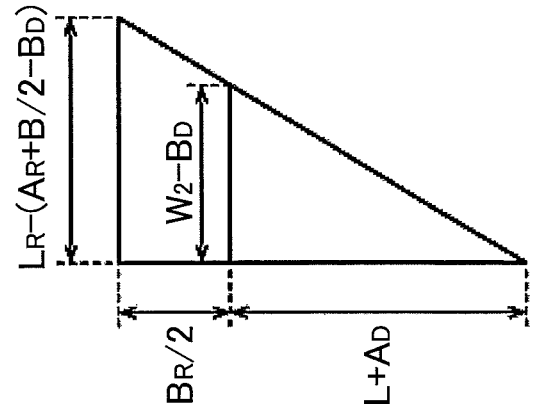
FIG. 5 is a model diagram used by the speed region calculation unit to calculate a condition B.
Figure 5A:
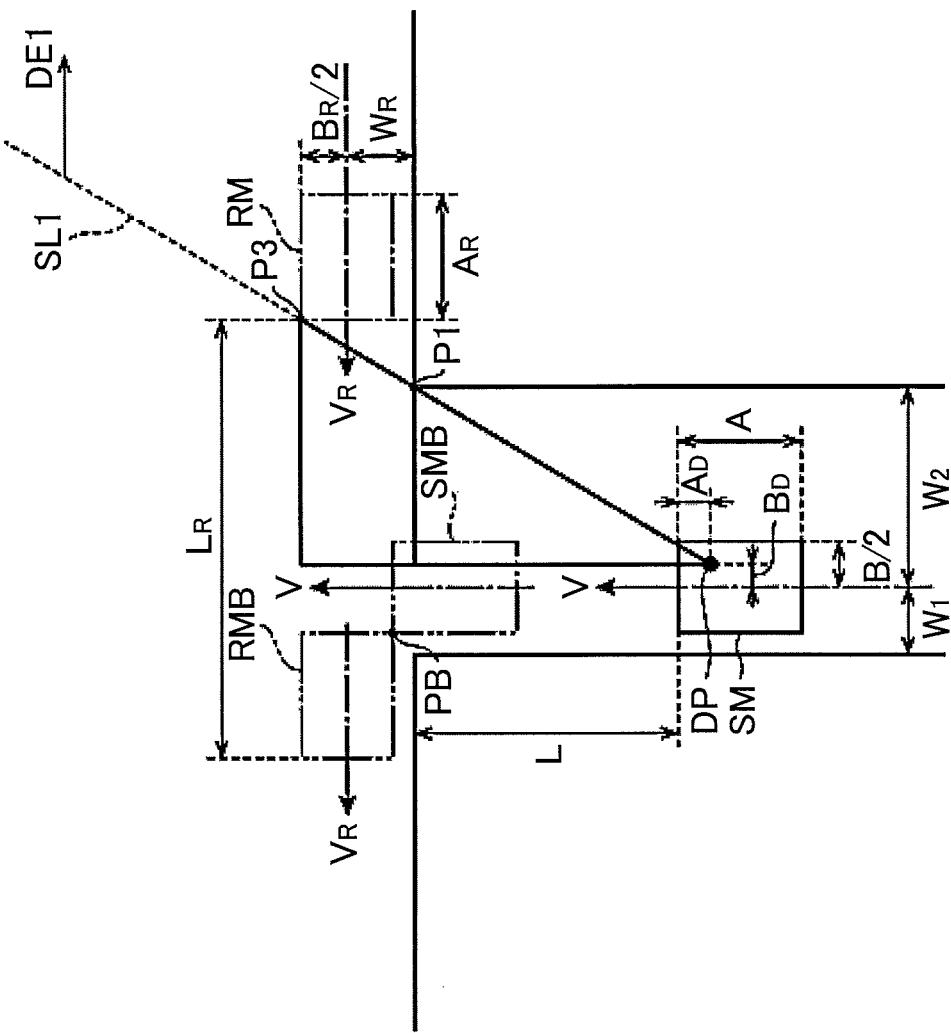

FIG. 5 is a model diagram used to calculate Condition B. A point PB at which a left rear corner portion of the other vehicle RM and a left front corner portion of the host vehicle SM overlap is shown in FIG. 5A. The position of the host vehicle SM and the position of the other vehicle RM at this time are denoted respectively by SMB and RMB. In FIG. 5A, a distance by which the host vehicle SM moves to the position SMB is $(L+W_R-B_R/2)$. A distance by which the other vehicle RM moves to the position RMB, meanwhile, is denoted by $L_R$.

Here, the distance $L_R$ is an unrecognized quantity. However, the right-angled triangle drawn from the positional relationship between the driver DP and the corner P1 and the right-angled triangle drawn from the positional relationship between the driver DP and the corner portion P3 have a homologous relationship, and therefore a relationship shown in Equation (1B) is established from a dimensional relationship shown in FIG. 5B. By expanding Equation (1B) to Equation (2B), the distance $L_R$ is expressed by Equation (3B). When a time required for the other vehicle RM to reach the position RMB is set as $t_{R\_}B$, the time $t_{R\_}B$ is expressed as shown in Equation (4B) using the distance $L_R$. Here, according to Condition B, the movement distance of the host vehicle SM needs to be equal to or smaller than the movement distance required to reach the position SMB at a point where the other vehicle RM reaches the position RMB (i.e. upon the elapse of the time $t_{R\_B}$). In other words, the speed V of the host vehicle SM needs to be equal to or lower than a speed required for the host vehicle SM to reach the position SMB following the elapse of the time $t_{R\_B}$. Hence, when a speed required to satisfy Condition B is set as $V_B$, the speed $V_B$ is expressed as shown in Equation (5B).

$$L_R + (A_R + B/2 + B_D) : W_2 - B_D = L + A_D + W_R + B_R/2 : L + A_D \quad (1B)$$

$$\{L_R - (A_R + B/2 + B_D)\}(L + A_D) = (W_2 - B_D)(L + A_D + W_R + B_R/2) \quad (2B)$$

$$L_R = \{(W_2 - B_D)(L + A_D + W_R + B_R/2) + (A_R + B/2 + B_D)(L + A_D)\} / (L + A_D) \quad (3B)$$

$$t_{R\_B} = L_R / V_R \quad (4B)$$

$$V_B \leq (L + W_R - B_R/2) / t_{R\_B} \quad (5B)$$

The speed region calculation unit 23 specifies a region in which Condition B is satisfied on the coordinate system shown in FIG. 8. More specifically, the speed region calculation unit 23 draws a graph B showing max ($V_B$) using Equations (3B), (4B), and (5B). The speed region calculation unit 23 then sets a speed region at and below max ($V_B$) as the region in which Condition B is satisfied.

(Condition C)

FIG. 6 is a model diagram used to calculate Condition C. A point PC at which a left front corner portion of the other vehicle LM and a left rear corner portion of the host vehicle SM overlap is shown in FIG. 6A. The position of the host vehicle SM and the position of the other vehicle LM at this time are denoted respectively by SMC and LMC. In FIG. 6A, a distance by which the host vehicle SM moves to the position SMC is ($L+W_L+B_L/2+A$). A distance by which the other vehicle LM moves to the position LMC, meanwhile, is denoted by $L_L$.

Here, the distance $L_L$ is an unrecognized quantity. However, a right-angled triangle drawn from a positional relationship between the driver DP and the corner P2 and a right-angled triangle drawn from a positional relationship between the driver DP and the corner portion P4 have a homologous relationship, and therefore a relationship shown in Equation (1C) is established from a dimensional relationship shown in FIG. 6B. By expanding Equation (1C) to Equation (2C), the distance $L_L$ is expressed by Equation (3C). When a time required for the other vehicle LM to reach the position LMC is set as $t_{L\_C}$, the time $t_{L\_C}$ is expressed as shown in Equation (4C) using the distance $L_L$. Here, according to Condition C, a movement distance of the host vehicle SM needs to be equal to or larger than the movement distance required to reach the position SMC at a point where the other vehicle LM reaches the position LMC (i.e. upon the elapse of the time $t_{L\_C}$). In other words, the speed V of the host vehicle SM needs to be equal to or higher than a speed required for the host vehicle SM to reach the position SMC following the elapse of the time $t_{L\_C}$. Hence, when a speed required to satisfy Condition C is set as $V_C$, the speed $V_C$ is expressed as shown in Equation (5C).

$$L_L + B/2 + B_D : W_1 - B_D = L + A_D + W_L + B_L/2 : L + A_D \quad (1C)$$

$$(L_L + B/2 + B_D)(L + A_D) = (W_1 + B_D)(L + A_D + W_L + B_L/2) \quad (2C)$$

$$L_L = \{(W_1 + B_D)(L + A_D + W_L + B_L/2) - (B/2 + B_D)(L + A_D)\} / (L + A_D) \quad (3C)$$

$$t_{L\_C} = L_L / V_L \quad (4C)$$

$$V_C \geq (A + L + W_L + B_L/2) / t_{L\_C} \quad (5C)$$

The speed region calculation unit 23 specifies a region in which Condition C is satisfied on the coordinate system shown in FIG. 8. More specifically, the speed region calculation unit 23 draws a graph C showing min ($V_C$) using Equations (3C), (4C), and (5C). The speed region calculation unit 23 then sets a speed region at and above min ($V_C$) as the region in which Condition C is satisfied.

(Condition D)

Figures 7A, 7B:
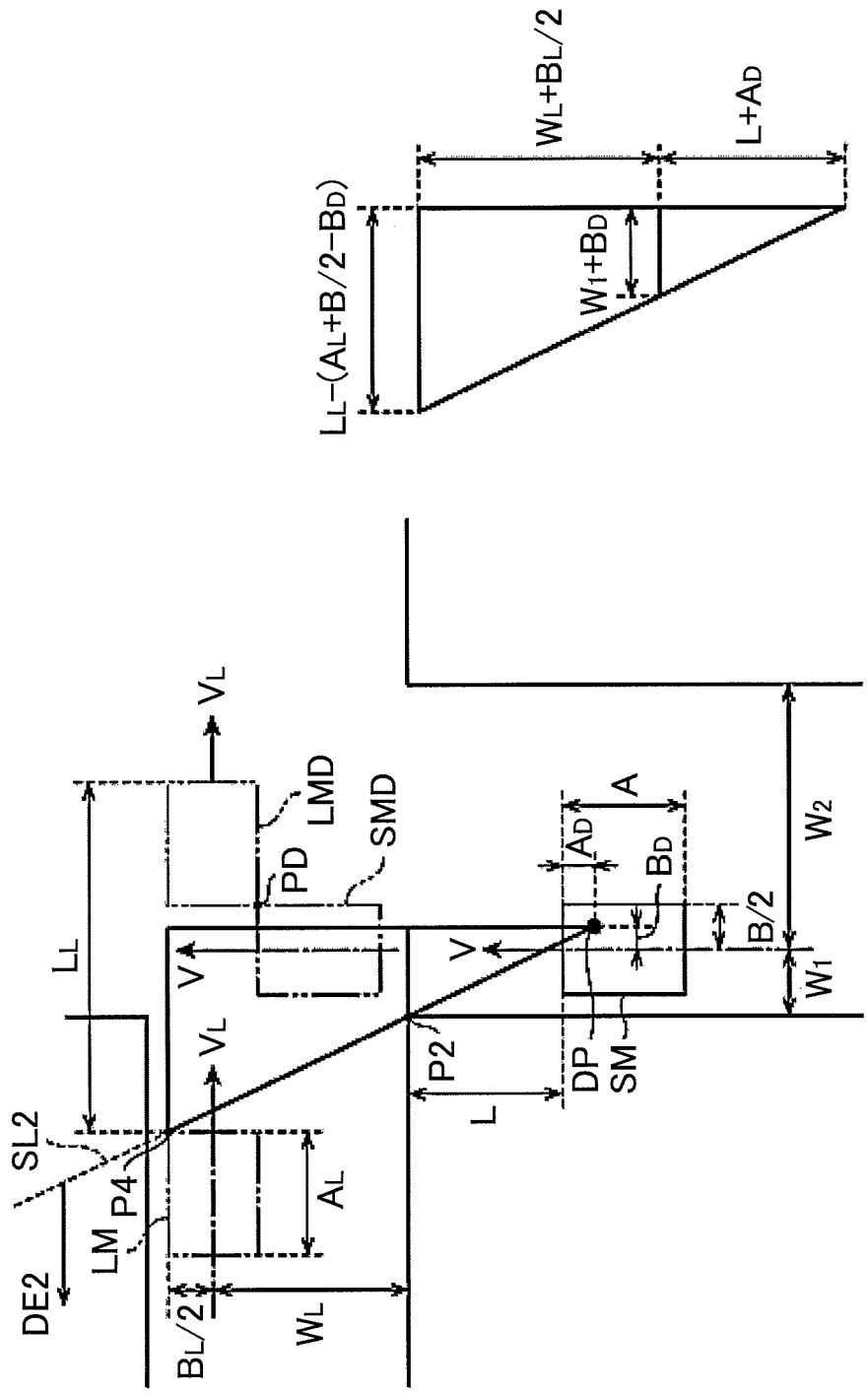
FIG. 7 is a model diagram used by the speed region calculation unit to calculate a condition D.

FIG. 7 is a model diagram used to calculate Condition D. A point PD at which a right rear corner portion of the other vehicle LM and a right front corner portion of the host vehicle SM overlap is shown in FIG. 7A. The position of the host vehicle SM and the position of the other vehicle LM at this time are denoted respectively by SMD and LMD. In FIG. 7A, a distance by which the host vehicle SM moves to the position SMD is ($L+W_L-B_L/2$). A distance by which the other vehicle LM moves to the position LMD, meanwhile, is denoted by $L_L$.

Here, the distance $L_L$ is an unrecognized quantity. However, the right-angled triangle drawn from the positional relationship between the driver DP and the corner P2 and the right-angled triangle drawn from the positional relationship between the driver DP and the corner portion P4 have a homologous relationship, and therefore a relationship shown in Equation (1D) is established from a dimensional relationship shown in FIG. 7B. By expanding Equation (1D) to Equation (2D), the distance $L_L$ is expressed by Equation (3D). When a time required for the other vehicle LM to reach the position LMD is set as $t_{L\_D}$, the time $t_{L\_D}$ is expressed as shown in Equation (4D) using the distance $L_L$. Here, according to Condition D, a movement distance of the host vehicle SM needs to be equal to or smaller than the movement distance required to reach the position SMD at a point where the other vehicle LM reaches the position LMD (i.e. upon the elapse of the time $t_{L\_D}$). In other words, the speed V of the host vehicle SM needs to be equal to or lower than a speed required for the host vehicle SM to reach the position SMD following the elapse of the time $t_{L\_D}$. Hence, when a speed required to satisfy Condition D is set as $V_D$, the speed $V_D$ is expressed as shown in Equation (5D).

$$L_L - (A_L + B/2 - B_D) : W_2 + B_D = L + A_D + W_L + B_L/2 : L + A_D \quad (1D)$$

$$\{L_L - (A_L + B/2 - B_D)\}(L + A_D) = (W_1 + B_D)(L + A_D + W_L + B_L/2) \quad (2D)$$

$$L_L = \{(W_1 + B_D)(L + A_D + W_L + B_L/2) + (A_L + B/2 - B_D)(L + A_D)\} / (L + A_D) \quad (3D)$$

$$t_{L\_D} = L_L / V_L \quad (4D)$$

$$V_D \leq (L + W_L - B_L/2) / t_{L\_D} \quad (5D)$$

The speed region calculation unit 23 specifies a region in which Condition D is satisfied on the coordinate system shown in FIG. 8. More specifically, the speed region calculation unit 23 draws a graph D showing max ($V_D$) using Equations (3D), (4D), and (5D). The speed region calculation unit 23 then sets a speed region at and below max ($V_D$) as the region in which Condition D is satisfied.

As shown in FIG. 8, on the basis of the above calculations, the speed region calculation unit 23 sets a speed region in which max ($V_B$, $V_D$)<V<min($V_A$, $V_C$) as the danger zone DZ. Note that in actual calculations, the graphs A to D take the form of curves, but to facilitate understanding, the graphs A to D shown schematically in FIG. 8 are depicted as straight lines.

The danger zone DZ will now be described. It is assumed that when the host vehicle SM reaches the position of a predetermined distance L, the speed V of the host vehicle SM is in the danger zone DZ. When, in this condition, the other vehicles RM, LM jump out from the respective dead zones DE1, 2 at a following moment while the host vehicle SM travels at the speed V and remains at a fixed speed and in a fixed lateral position, the host vehicle SM may come into contact with the other vehicles RM, LM. If the other vehicles RM, LM jump out, the host vehicle SM must perform emergency braking or emergency steering. In other words, if the other vehicles RM, LM jump out from the dead zones DE1, 2 at the following moment when the speed condition of the host vehicle SM is in the danger zone DZ, the possibility of a collision arises. Hence, the host vehicle SM preferably travels so as to avoid the danger zone DZ.

More specifically, as shown in FIG. 8, cases in which the speed of the host vehicle is $V_1$, $V_2$, and $V_3$ at a point where a distance $L_S$ is reached will be described. The speed $V_1$ is higher than min ($V_A$, $V_C$), and therefore, even if the other vehicles RM, LM jump out at the next moment, the host vehicle SM can cross the intersection before the other vehicles. The speed $V_2$ is in the danger zone DZ, and therefore, if the other vehicles RM, LM jump out at the next moment (and emergency braking or emergency steering is not performed), the host vehicle SM may come into contact with the other vehicles RM, LM. The speed $V_3$ is lower than max ($V_B$, $V_D$), and therefore, even if the other vehicles RM, LM jump out at the next moment, the host vehicle SM can cross the intersection after the other vehicles. If, however, the host vehicle continues to travel at the speed $V_3$ so as to approach the dead zone entry point (i.e. when L approaches 0), the speed $V_3$ enters the danger zone DZ.

Figure 9:
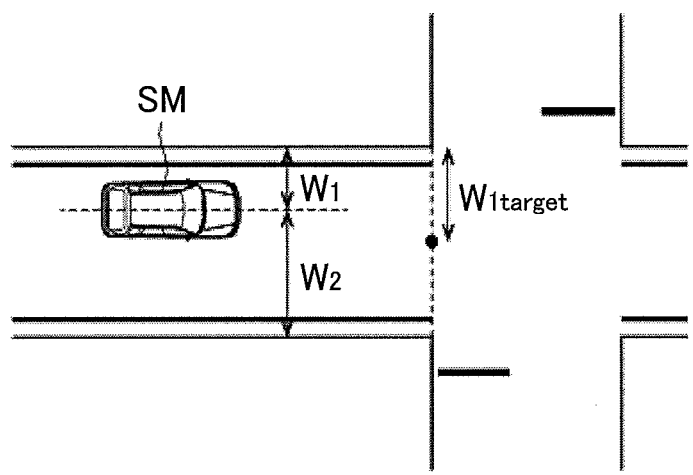
FIG. 9 is a view illustrating side intervals.
Figure 11A:
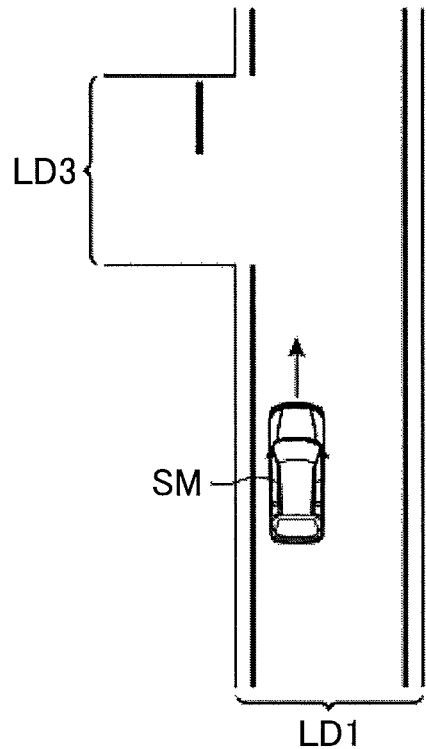
FIG. 11 is a view showing an example of elements taken into consideration by a moving body information setting unit when setting moving body information.
Figure 11B:
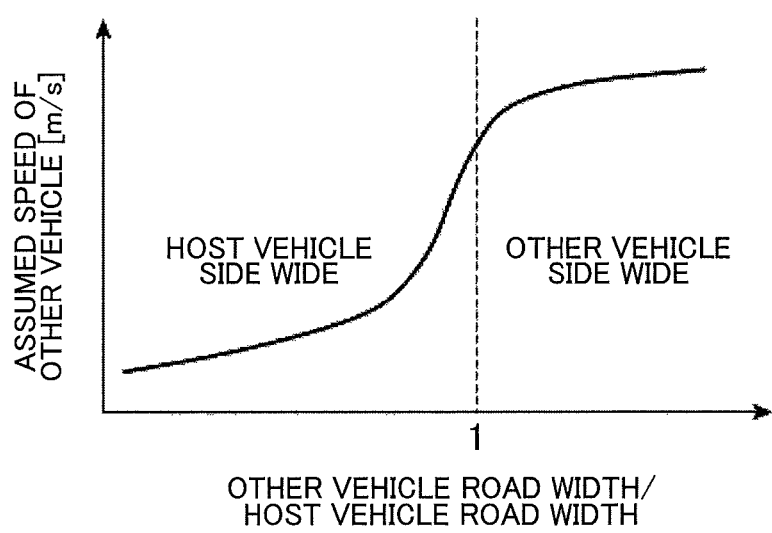

Next, the target lateral position calculation unit 25 calculates the target lateral position of the host vehicle SM on the basis of the danger zone DZ calculated in S120 (step S130). As shown in FIG. 9, the road has a constant width, and therefore the leftward side interval $W_1$ and the rightward side interval $W_2$ differ according to the lateral position of the host vehicle SM. For example, when the leftward side interval $W_1$ is small, the left side dead zone DE2 increases, and when the rightward side interval $W_2$ is small, the right side dead zone DE1 increases. In other words, the lateral position of the host vehicle SM affects safety. In S130, the target lateral position calculation unit 25 calculates a target side interval $W_{1 target}$ at which safety can be improved. The target side interval $W_{1 target}$ serves as the target lateral position of the host vehicle SM at the dead zone entry point (L=0).

In the processing of S130, the speed region calculation unit 23 calculates the danger zone DZ in advance in relation to a plurality of side interval ($W_1$, $W_2$) patterns and stores the calculation results in the form of a map. Note that the speed region calculation unit 23 is capable of specifying the dead zones DE1, 2 through calculation even under a different position condition to the actual position of the host vehicle SM at the time of the calculation, and therefore the speed region calculation unit 23 can calculate the danger zone DZ in relation to the plurality of side interval ($W_1$, $W_2$) patterns.

FIG. 10 shows an example of the map. On the map, speeds at the dead zone entry point (L=0) are extracted from the danger zone DZ and associated with the respective side interval ($W_1$, $W_2$) patterns. A on the map denotes a relationship between min ($V_A$) at L=0 and the side intervals ($W_1$, $W_2$). B on the map denotes a relationship between max ($V_B$) at L=0 and the side intervals ($W_1$, $W_2$). C on the map denotes a relationship between min ($V_C$) at L=0 and the side intervals ($W_1$, $W_2$). D on the map denotes a relationship between max ($V_D$) at L=0 and the side intervals ($W_1$, $W_2$). When the lateral position is left-of-center (when $W_1$ is small), the other vehicle LM approaching from the left side is difficult to see, and therefore min ($V_C$) increases. When the lateral position is right-of-center (when $W_2$ is small), the other vehicle RM approaching from the right side is difficult to see, and therefore min ($V_A$) increases. The smaller of max ($V_B$) and max ($V_D$) is set on the map in advance as a lower limit value of the danger zone (a maximum value of a lower speed than the danger zone). In FIG. 10, max ($V_B$) is set as the lower limit value regardless of the side intervals. The larger of min ($V_A$) and min ($V_C$) is set on the map in advance as an upper limit value of the danger zone (a minimum value of a higher speed than the danger zone). In FIG. 10, min ($V_C$) is set as the upper limit value in a left-of-center region and min ($V_A$) is set as the upper limit value in a right-of-center region, using side intervals ($W_1$, $W_2$)=(4.5, 1.5) as a boundary.

The target lateral position calculation unit 25 sets an optimum target lateral position on the basis of a map such as that shown in FIG. 10. For example, the target lateral position calculation unit 25 sets side intervals at which the lower limit value of the danger zone is at a maximum as the target side interval $W_{1 target}$. In the example of FIG. 10, max ($V_B$) reaches a maximum at the side intervals ($W_1$, $W_2$)=(4.5, 1.5). Further, the target lateral position calculation unit 25 sets side intervals at which a difference between the lower limit value and the upper limit value is at a minimum as the target side interval $W_{1 target}$. In the example of FIG. 10, the difference between the upper limit value and the lower limit value is at a minimum at side intervals ($W_1$, $W_2$)=(2.5, 3.5) corresponding to a position in which min ($V_A$) and min ($V_C$) intersect.

Next, the target speed calculation unit 24 calculates a target speed $V_{target}$ of the host vehicle SM on the basis of the danger zone DZ calculated in S120 (step S140). The target speed calculation unit 24 sets a speed at which the danger zone DZ can be avoided regardless of the distance L as the target speed $V_{target}$. Here, the target speed calculation unit 24 sets the lower limit value of the danger zone (the maximum value of a lower speed than the danger zone), or in other words the smaller of the values of max ($V_B$) and max ($V_D$) at L=0, as the target speed $V_{target}$. In FIG. 8, max ($V_B$) at L=0 is set as the lower limit value, and therefore max ($V_B$) at L=0 is set as the target speed $V_{target}$. At this time, any value that is lower than the speed range of the danger zone DZ at L=0 may be set as the target speed $V_{target}$, and therefore a lower value than max ($V_B$) may be set. Note that when the target lateral position has been set in S130, the target speed calculation unit 24 calculates the target speed $V_{target}$ using the danger zone DZ corresponding to the target lateral position.

Next, the driving assistance control unit 31 determines whether or not driving assistance is required on the basis of the target lateral position calculated in S130, the target speed calculated in S140, and the actual lateral position and speed of the host vehicle SM (step S150). More specifically, the driving assistance control unit 31 determines whether or not a current side interval $W_{1 now}$ of the host vehicle SM differs from the target side interval $W_{1target}$ (whether or not a difference therebetween is larger than a predetermined threshold). When it is determined that the current side interval $W_{1now}$ is identical to the target side interval $W_{1target}$, the driving assistance control unit 31 determines that driving assistance to adjust the lateral position is not required, and when it is determined that the current side interval $W_{1now}$ and the target side interval $W_{1target}$ are different, the driving assistance control unit 31 determines that driving assistance to adjust the lateral position is required. The driving assistance control unit 31 also determines whether or not a current speed $V_{now}$ of the host vehicle SM is higher than the target speed $V_{target}$. When it is determined that the speed $V_{now}$ is equal to or lower than the target speed $V_{target}$, the driving assistance control unit 31 determines that driving assistance to adjust the speed is not required, and when it is determined that the speed $V_{now}$ is higher than the target speed $V_{target}$, the driving assistance control unit 31 determines that driving assistance to adjust the speed is required. When it is determined in S150 that neither type of driving assistance is required, the control processing shown in FIG. 3 is terminated. When it is determined that at least one type of processing is required, on the other hand, the processing advances to step S160. For example, the speed $V_{now}$ shown in FIG. 8 enters the danger zone DZ when the host vehicle SM approaches the dead zone entry point, and therefore driving assistance is required.

The driving assistance control unit 31 performs driving assistance to move the host vehicle SM to the target lateral position and driving assistance to set the speed of the host vehicle SM at the target speed on the basis of the determination results obtained in S150 (step S160). For example, the driving assistance control unit 31 may forcibly decelerate the host vehicle SM to the target speed $V_{target}$ by controlling the travel assistance unit 11. Note that at this time, as shown in FIG. 8, a deceleration course is preferably set such that the danger zone DZ is avoided even while shifting from the speed $V_{now}$ to the target speed $V_{target}$. Alternatively, the driving assistance control unit 31 may instruct the driver DP to decelerate to the target speed $V_{target}$ using the display unit 8 and the sound generation unit 9. The driving assistance control unit 31 may forcibly move the host vehicle SM to the target side interval $W_{1target}$ by controlling the travel assistance unit 11. Alternatively, the driving assistance control unit 31 may instruct the driver DP to move to the target side interval $W_{1target}$ using the display unit 8 and the sound generation unit 9. Note that either one of forcible driving assistance and driving assistance through instruction may be performed alone as the driving assistance relating to the speed and the lateral position, or both may be performed simultaneously. Further, either one of the driving assistance for realizing the target speed $V_{target}$ and the driving assistance for realizing the target side interval $W_{1target}$ may be performed alone, or both may be performed either at different timings or simultaneously.

When the dead zone exists in a plurality of directions, as in this embodiment, the driving assistance control unit 31 may determine a dangerous direction in which great danger exists on the basis of the danger zone DZ. As shown on the graph in FIG. 8, for example, the lower limit value of the danger zone DZ is determined by min ($V_B$) corresponding to the right side condition. It is therefore evident that a vehicle jumping out from the right side poses a greater risk than a vehicle jumping out from the left side. Further, depending on the shape of the intersection and the manner in which the host vehicle SM enters the intersection, a vehicle jumping out from the left side may pose a greater risk. Hence, the driving assistance control unit 31 may determine the dangerous direction in which great danger exists, and issue a warning that causes the driver DP to look toward the dangerous direction. For example, the driving assistance control unit 31 may increase the volume of a right side warning sound, increase the size of a display on a right side of the display unit 8, or change the color of the display on the right side to a warning color.

The driving assistance control unit 31 may also take into consideration the gaze direction of the driver DP. The driving assistance control unit 31 obtains a detection result from the gaze direction detection unit 29, and determines whether or not the gaze direction of the driver matches the calculated dangerous direction. On the basis of the determination result, the driving assistance control unit 31 can reduce the driving assistance when the driver is looking toward the dangerous direction and intensify the driving assistance when the driver is not looking toward the dangerous direction. For example, the driving assistance control unit 31 performs control such as that shown in FIG. 12. Intensifying the driving assistance means increasing a braking strength or advancing a start timing of the driving assistance, for example.

When the processing of S160 is complete, the control processing shown in FIG. 3 is terminated, whereupon the processing is restarted from S100.

Next, actions and effects of the drive assist apparatus 1 according to this embodiment will be described.

In the drive assist apparatus 1 according to this embodiment, the moving body information setting unit 22 predicts a moving body that may jump out from the dead zone, and sets moving body information relating to the moving body. Further, the speed region calculation unit 23 can calculate a travel speed of the host vehicle at which the host vehicle may come into contact with the moving body on the basis of the assumed speed of the moving body predicted to jump out from the dead zone. The speed region calculation unit 23 can then calculate the speed region (the danger zone DZ) in which contact with the moving body may occur. The target speed calculation unit 24 calculates the target speed on the basis of the calculated speed region. Hence, the drive assist apparatus 1, rather than comparing an envisaged moving body with the predicted course of the host vehicle SM, calculates the speed region in which contact with the moving body may occur, and then calculates the target speed on the basis of this calculation. In so doing, the drive assist apparatus 1 can perform control on the basis of a specific target speed at which the host vehicle SM should travel, and can therefore provide driving assistance such that a high degree of safety is secured. Furthermore, the driving assistance provided by the drive assist apparatus 1 is not affected by the precision with which the path of the host vehicle is predicted, and therefore appropriate driving assistance can be provided. As a result, the drive assist apparatus 1 is capable of providing appropriate driving assistance with which safety can be secured reliably.

Further, rather than providing driving assistance after detecting a moving body actually jumping out from the dead zone, the drive assist apparatus can provide driving assistance by predicting the moving body (and the assumed speed thereof) in advance regardless of whether or not the moving body actually jumps out. The drive assist apparatus 1 can calculate the target speed after predicting the danger envisaged when the dead zone crosses the intersection, and in so doing can provide driving assistance with which safety is secured reliably even when the moving body actually jumps out from the dead zone.

The drive assist apparatus 1 includes the target lateral position calculation unit 25 that calculates the target lateral position of the host vehicle SM on the basis of the speed region calculated by the speed region calculation unit 23. The size of the dead zone varies according to the lateral position of the host vehicle SM, leading to variation in the danger of contact with the moving body. Hence, by having the target lateral position calculation unit 25 calculate the target lateral position, the drive assist apparatus 1 can provide appropriate driving assistance such that the host vehicle SM travels in a safe lateral position.

In the drive assist apparatus 1, the moving body information setting unit 22 may set the moving body information on the basis of the shapes of the roads constituting the dead zone. The behavior of the moving body that may jump out from the dead zone is affected by the shape of the road, and therefore, by taking the shape of the road into consideration, the drive assist apparatus 1 can provide driving assistance with a higher degree of precision.

In the drive assist apparatus 1, the moving body information setting unit 22 may set the moving body information on the basis of the ratio between the moving body-side lane width and the host vehicle-side lane width. By taking the ratio between the respective lane widths into account in this manner, the drive assist apparatus 1 can provide driving assistance more closely aligned with the sensations of the driver and the actual speed at which the moving body jumps out.

In the drive assist apparatus 1, the moving body information setting unit 22 may set the moving body information on the basis of the peripheral environment of the dead zone. By taking the peripheral environment of the dead zone into consideration in this manner, the drive assist apparatus 1 can provide driving assistance more closely aligned with the sensations of the driver.

The drive assist apparatus 1 includes the traffic information acquisition unit 26 that obtains traffic information relating to the roads constituting the dead zone, and the moving body information setting unit 22 may set the moving body information on the basis of the traffic information obtained by the traffic information acquisition unit 26. By taking into consideration traffic information that cannot be learned simply from the information relating to the periphery of the dead zone in this manner, the drive assist apparatus 1 can provide effective driving assistance with which safety can be secured reliably when the host vehicle travels along a road having a particularly dangerous dead zone.

The drive assist apparatus 1 includes the experience information acquisition unit 27 that obtains information indicating the past experience of the driver, and the moving body information setting unit 22 may set the moving body information on the basis of the experience information obtained by the experience information acquisition unit 27. By using information indicating the past experience of the driver in this manner, the drive assist apparatus 1 can provide driving assistance in alignment with the experience of the driver.

The drive assist apparatus 1 includes the object information acquisition unit 28 that obtains object information relating to the behavior of objects existing on the periphery of the host vehicle, and the moving body information setting unit 22 may set the moving body information on the basis of the object information obtained by the object information acquisition unit 28. The behavior of objects on the periphery of the host vehicle also affects the speed and so on of the moving body that jumps out, and therefore, by taking this information into account, the drive assist apparatus 1 can provide driving assistance more suited to the situation.

The drive assist apparatus 1 includes the driving assistance control unit 31 that issues a warning to alert the driver to the dead zone. When the dead zone exists in a plurality of directions, the driving assistance control unit 31 may determine the dangerous direction in which great danger exists on the basis of the shape of the speed region calculated by the speed region calculation unit 23, and control warning issuance so that the driver looks toward the dangerous direction. In so doing, the drive assist apparatus 1 can issue a warning that causes the driver to look toward the dangerous direction in which great danger exists, and as a result, a danger forestalling effect can be improved.

The drive assist apparatus 1 includes the gaze direction detection unit 29 that detects the gaze direction of the driver, and the driving assistance control unit 31 may control warning issuance on the basis of the dangerous direction and the gaze direction. By controlling warning issuance in consideration of the gaze direction of the driver in this manner, a load on the driver can be reduced, and in a situation where driving assistance actually becomes necessary, the driving assistance can be executed more effectively.

The invention is not limited to the embodiment described above.

For example, another vehicle was cited as an example of the moving body, but the moving body may be any object that may jump out from the dead zone, such as a two-wheeled vehicle. The set moving body information is modified according to the type of moving body.

Further, in the above embodiment, the moving body information setting unit 22 takes various elements into consideration when setting the moving body information, but the moving body information setting unit 22 need not take all of these elements into consideration, and may consider only a part or one of the elements.

Note that in the above embodiment, only a target speed at $L=0$ is set as the target speed, but a plurality of target speeds on the way to $L=0$ may be set. For example, a target speed may be set at fixed intervals from the current position of the host vehicle SM to the dead zone entry point ($L=0$) (such that the target speed gradually decreasing toward the dead zone entry point), and a target speed profile from the current position to $L=0$ may be calculated.

In the above embodiment, the danger zone DZ is set without providing a specific range in relation to the distance L of the host vehicle to the dead zone entry point. Instead, however, the danger zone DZ may be limited to a fixed range such as "$0 \leq L \leq X1$", for example. Further, the danger zone DZ may be set relative to only a predetermined L such that the danger zone DZ is set only in the $L=0$ part (in other words, such that the target speed is set on the basis of only the speed region at $L=0$), for example.

INDUSTRIAL APPLICABILITY

The invention can be used as a drive assist apparatus.
1 drive assist apparatus
21 dead zone recognition unit
22 moving body information setting unit
23 speed region calculation unit
24 target speed calculation unit
25 target lateral position calculation unit
26 traffic information acquisition unit
27 object information acquisition unit
29 gaze direction detection unit
31 driving assistance control unit (warning issuance control unit)
SM host vehicle
RM, LM other vehicle (moving body)
DP driver

The invention claimed is:

1. A drive assist apparatus comprising:
a dead zone recognition unit that recognizes a dead zone not visible to a driver in an advancement direction of a host vehicle;
a moving body information setting unit that sets, as information relating to a moving body that may jump out from the dead zone, the moving body information including at least an assumed speed of the moving body;
a speed region calculation unit that calculates, on the basis of the moving body information set by the moving body information setting unit, a speed region of the host vehicle, the speed region being a region in which the host vehicle may contact the moving body when the host vehicle advances in the advancement direction; and
a target speed calculation unit that calculates a target speed of the host vehicle on the basis of the speed region,
wherein the speed region calculation unit calculates the speed region by calculating at least a condition on which the moving body can pass before the host vehicle on the basis of the assumed speed of the moving body, and the drive assist apparatus is configured to adjust the speed of the host vehicle based on the target speed.

2. The drive assist apparatus according to claim 1, wherein the speed region is determined from a relationship between a speed of the host vehicle and a distance of the host vehicle to a reference position in a location constituting the dead zone.

3. The drive assist apparatus according to claim 1, further comprising a target lateral position calculation unit that calculates a target lateral position of the host vehicle on the basis of the speed region calculated by the speed region calculation unit.

4. The drive assist apparatus according to claim 1, wherein the moving body information setting unit sets the moving body information on the basis of a shape of a road constituting the dead zone.

5. The drive assist apparatus according to claim 4, wherein the moving body information setting unit sets the moving body information on the basis of a ratio between a moving body-side lane width and a host vehicle-side lane width.

6. The drive assist apparatus according to claim 1 wherein the moving body information setting unit sets the moving body information on the basis of a peripheral environment of the dead zone.

7. The drive assist apparatus according to claim 1, further comprising a traffic information acquisition unit that obtains traffic information relating to the road constituting the dead zone,
wherein the moving body information setting unit sets the moving body information on the basis of the traffic information obtained by the traffic information acquisition unit.

8. The drive assist apparatus according to claim 1, further comprising an experience information acquisition unit that obtains experience information indicating past experience of the driver,
wherein the moving body information setting unit sets the moving body information on the basis of the experience information obtained by the experience information acquisition unit.

9. The drive assist apparatus according to claim 1, further comprising an object information acquisition unit that obtains object information relating to behavior of an object existing on a periphery of the host vehicle,
wherein the moving body information setting unit sets the moving body information on the basis of the object information obtained by the object information acquisition unit.

10. The drive assist apparatus according to claim 1, further comprising a warning issuance control unit that issues a warning to the driver to alert the driver to the dead zone,
wherein, when the dead zone exists in a plurality of directions, the warning issuance control unit determines a dangerous direction in which great danger exists on the basis of a shape of the speed region calculated by the speed region calculation unit, and controls warning issuance so that the driver looks toward the dangerous direction.

11. The drive assist apparatus according to claim 10, further comprising a gaze direction detection unit that detects a gaze direction of the driver,
wherein the warning issuance control unit controls warning issuance on the basis of the dangerous direction and the gaze direction.

12. The drive assist apparatus according to claim 1, wherein the moving body information includes an assumed size of the moving body.

13. The drive assist apparatus according to claim 1, wherein the speed region calculation unit calculates the speed region by calculating a condition on which a front corner portion of the host vehicle and a rear corner portion of the moving body overlap.

* * * * *